2,740,719

QUICK COOKING RICE AND PROCESS THEREFOR

Ataullah K. Ozai-Durrani, Stuttgart, Ark.

No Drawing. Application January 22, 1953,
Serial No. 332,773

8 Claims. (Cl. 99—80)

This invention relates to a method of preparing a quick cooking rice product. The present application is a continuation-in-part of application Serial No. 744,034, filed April 25, 1947, now abandoned, and copending application Serial No. 193,525, filed November 1, 1950.

A grain of rice when harvested, includes an inner endosperm and germ which consists mainly of starch or gluten, depending on the type of the rice, covered by a pericarp or bran layer which contains most of the oil, fats, vitamins, proteins and minerals, and a silicious outer husk or hull. In order to make it suitable for human consumption, at least the husk must be removed from the grain. Rice kernels from which only the hull has been removed are known as brown or husked rice. If rough or brown rice is milled to remove some or all of the pericarp or bran, the rice product known as white rice is obtained. In order to mill and store the rice conveniently, its originally higher moisture content is reduced by drying to about 10 to 14%. By removing the bran, some of the valuable nutritional elements contained therein are lost.

For the preservation of the nutritional elements contained in the bran, the rice is usually parboiled before milling to remove the bran. The parboiling process may vary somewhat but in general consists in soaking the paddy in cool or warm water below the gelatinization temperature of the kernel which is at about 150° to 160° F. The water penetrates through the pores of the hull and bran, dissolves to large extent the soluble nutritional elements contained in the bran and carries them into the kernel. The starchy constituents of the kernel absorb the water and retain and preserve the nutritional elements dissolved therein from the bran. The kernel also swells by the absorption of water but, because the temperature is held below the gelatinization temperature of the starch, does not gelatinize. Thus the initial moisture content of the kernel can be raised to higher moisture content at temperatures above room temperature. After saturation or other desired moisture content is reached, the soaking of the rice is stopped and any excess of the water in which the rice has been soaked, is drained off. The soaked rice is then heated above its gelatinization temperature so that the kernel gelatinizes. During gelatinization the kernel takes up additional moisture so that the completely gelatinized rice contains between about 33% and 42% moisture, depending on the conditions under which it has been parboiled. The rice is parboiled preferably by treating it with steam of proper temperature. In order to secure the latter, superheated steam is sometimes released upon the rice grains. Gelatinization is accompanied by further swelling of the kernels which therefore burst the hulls. The parboiled rice kernel is soft, pliable and rubbery and will bend without breaking. It is the general practice to dry the parboiled rice to a moisture content of about 10 to 14% and to mill the rice to remove the hull and most or all of the bran. Freshly harvested rice sometimes has a moisture content as high as about 26% and, as disclosed in my application Serial No. 546,053, filed July 21, 1944, the initial soaking of the rice may therefore be omitted or at least shortened if freshly harvested rice is used with a moisture content of 26% or more. Thereby the procedure of parboiling the rice as described above can be simplified.

When parboiled rough rice is dried to a stabilized moisture content of about 10 to 14% for subsequent milling, the milled rice product forms a hard and stiff mass which is translucent and of a color from dark to light brown and sometimes almost white. Examined under the magnifier or held up to the light, the interior of the kernel appears uniformly translucent and its exterior smooth. It does not absorb water readily, and it therefore takes from 25 to 45 minutes to cool it before it is ready for consumption. The cooked rice is rubbery and chewy, and contains up to about 65 to 70% moisture.

The parboiled rice product prepared in any of the manners described hereinbefore, contains a large percentage of the nutritional elements which were in the bran. The consumers, nevertheless, prefer ordinarily milled rice which has not been parboiled, because it is, upon cooking, white in color, soft in texture and not rubbery.

It is an object of the invention to provide a quick cooking rice and a process for obtaining the same.

It is another object of the invention to treat rice so as to promote its penetration by boiling water and thereby reduce the time required for cooking the rice.

It has now been found that rice can be rendered quick cooking by steaming the same and thereafter drying. Such steaming renders the rice porous and thereby facilitates the entry of water which is required to properly cook the rice and, accordingly, the cooking time is considerably shortened. The steaming can be of a very short duration and the exact time required is, for the most part, determined by apparatus limitations. However, it can be said that in the usual case a 30 second steaming period will suffice although to steam for longer periods, say, 5–15 minutes, is beneficial. The optimum period of steaming is determined not only by apparatus dimensions, design, etc., but also by the variety of the rice which is processed and by whether brown or white rice is used. The steaming period is also determined, of course, by the temperature or pressure of the steam that is employed. Steam of any reasonable degree of pressure and steam which has been slightly superheated may be used as well as the moist steam which is ordinarily used in commercial practice.

While a quick cooking rice is provided by steaming the rice, as indicated above, it is preferred to soak the rice prior to the steaming step. The soaking may serve to increase the moisture content to any extent desired but it has been found that the greater the degree of soaking the better the results with respect to texture, appearance and the like of the final cooked rice. It is preferred, therefore, to raise the moisture content to at least about 25% and it is still more preferred to soak the rice grains until they are substantially saturated and contain about 30% moisture.

Soaking the rice before steaming the same provides an improvement not only with respect to the final product but also in that which is sold to the consumer. The product which is steamed and dried is opaque while the product which is soaked before steaming is, after drying, translucent, longer grained and a generally better appearing product. As aforementioned, similar improvements are apparent with regard to the final cooked product as served at the table. That which has been prepared by soaking, steaming and drying is longer grained, of generally better appearance and of softer texture after being reconstituted by the housewife.

The conditions of steaming are to no particular extent altered by any previous soaking to which the rice grains may have been subjected. Although increasing the moisture content of the grains serves to decrease to a slight extent the tendency of the grains to absorb moisture during steaming, it is generally preferred that the steaming treatment be limited so that the increase in the moisture content of the rice grains is not substantially in excess of about 6%. In the case of soaking the rice grains to 25–30% moisture segmentation of the grains is caused thereby. Such segmentation increases the tendency of the grains to break up but this tendency can be overcome to a large extent by increasing the steaming period to increase the extent of gelatinization which apparently serves to cement the segments together. A steaming period of about 5 minutes is usually found to be sufficient to achieve this end. It is intended that the periods of steaming recited herein are to be interpreted to mean that the rice reaches the temperature of about 212° F. and is maintained thereat for the recited periods, for example, the period of 30 seconds mentioned herein.

In carrying out the practice of the present invention any hulled rice, e. g., brown, white or the parboiled rice of commerce may be employed. While the preferred processing conditions for white and brown rice call for soaking to saturation (30%), steaming for about 5 minutes and drying, the parboiled rice is best treated by soaking only to about 20% which requires only about 5 minutes, steaming for about 30 seconds and drying. While milled rice can be employed, rough rice or paddy may not be employed in the process of the invention because, as indicated above, soaking the same followed by steaming and drying results in parboiled rice which is hard, translucent and more difficult to cook than is normal rice.

While steaming may be carried out in any conventional manner using an autoclave, a rotary cooker and various other conventional apparatus, it is preferred to use such apparatus as will provide for the rapid passage of the steam through the rice grains so that in effect the grains are "blasted" with high pressure steam. This may, for example, be carried out by passing the rice through a vertically cylindrical cooker in the center of which is a perforated steam line through which steam under, say, 50–100 pounds is ejected at such a rate that even though it is vented from the column a pressure of about 5–10 pounds is maintained within the column. In such a case the hold-up period for the rice may be the previously mentioned 30 seconds or it may be as high as 5–15 minutes. The same steaming technique is also conveniently carried out in using a rotary cooker provided with a suitable vent so that the steam is permitted to rapidly pass through the cooker, provision being made for the best possible contact with the grains. The latter is usually effected by tumbling the grains in the path of the steam. Using such apparatus, however, usually requires that the operation be carried out in a batchwise fashion and for this reason the aforementioned column which can be rendered continuous is preferred.

The soaked and steamed grains may be dried in any conventional manner using slow drying as well as rapid drying techniques. It is believed that a somewhat better color is obtained in the final product if relatively slow drying is employed although from the standpoint of efficiency this is not ordinarily desirable and the improvement in color does not warrant it. Drying may be effected by simply spreading the rice out in thin layers in which case it requires a period of about two days or this period may be reduced by blowing air across or through the layer of rice, in which case the rice will be dried to a suitable moisture content in 12 or 24 hours. By employing a forced draft drier through which the layers of rice are conveyed and if at various stages the drying air is directed upwardly and downwardly through the rice as well as transversely across the top of the layer, it is possible to dry the rice in about 30 minutes. In this connection, it has been found that the optimum drying temperature is about 140° F. As indicated above, the drying should continue until the rice grains have been reduced to a suitable moisture content which is generally regarded as being within the range of 10–14%. After relatively rapid drying, of course, the moisture within the rice grains is not evenly distributed, being relatively high in the interior portion and low in the exterior portion. After cooling and storing for about 4–8 hours, however, the distribution becomes essentially even.

It is sometimes found desirable in connection with handling the rice, and especially if the same has been soaked to a relatively high moisture content such as 30%, to allow the same to drain, say, for 10 or 20 minutes. It is also desirable in connection with handling the rice after steaming to blast it with cold air, the same not only serving to remove surface moisture and prevent lumping, but also to set the grain and to some extent toughen it so that it may be subsequently handled with a minimum amount of breakage.

Soaking to achieve the objectives set forth above may be carried out by soaking the rice for about 30 minutes with the calculated amount of water required to increase the moisture content of the rice to the desired degree, or it may be effected by soaking the rice for a lesser period, say, 5 minutes, with excess water, the rice being drained thereafter. On the other hand, it is also possible to combine the rice with a calculated amount of water, tumbling the same in a rotary cooker for about 5 minutes and thereafter without draining start the introduction of the steam which may be continued for, say, 5 minutes after which the rice may be drained if necessary and then dried.

A specific example of the manner in which the process of the present invention may be carried out follows hereinbelow: 100 pounds of white rice with a moisture content of about 14% is placed in a 100 gallon vessel or tank together with about 60 gallons of water and allowed to soak for 30 minutes at room temperature (75° F.). Thereafter it is transferred from the tank to a screen and allowed to drain for 15 minutes. At this point the rice contains about 30% of moisture. Then the rice is transferred to an 80 gallon autoclave and treated with steam at 8 pounds gauge pressure for 5 minutes. The overall moisture content of the grains is about 34 or 35%. The rice grains are then removed from the cooker and dried in any conventional manner to a stable moisture content of 10 to 14%. A convenient and rapid way of effecting drying is to employ a forced draft, hot air drier using air at 140° F., the drying being effected in about 30 minutes. The product is packaged and distributed in the usual commercial manner. It may be rehydrated to the texture and character of ordinarily cooked rice by the housewife by simply placing the same in water, heating the water to a boil, continuing boiling for 5–10 minutes, depending upon the degree of softness desired in the rice, and allowing the rice to stand in the hot water in a covered vessel or pan for 10 minutes.

Although the present invention has been described with particular reference to specific embodiments, the same are not to be construed as in any way limiting the invention. Reference is therefore to be had solely to the appended claims for the purpose of determining the scope of said invention.

What is claimed is:

1. A process for preparing quick cooking rice which comprises steaming hulled rice grains under conditions such as to increase their moisture content by not more than about 6%, and thereafter drying the rice to a stable moisture content, said process serving to alter the structure of the grains in order that upon subsequent cooking the rice will absorb water very rapidly so that the time required for cooking is reduced.

2. A process for preparing quick cooking rice which comprises soaking hulled rice grains in water, steaming the soaked rice grains under conditions such as to increase their moisture content by not more than about 6%, and thereafter drying the rice to a stable moisture content, said process serving to alter the structure of the grains in order that upon subsequent cooking the rice will absorb water very rapidly so that the time required for cooking is reduced.

3. A process for preparing quick cooking rice which comprises soaking hulled, parboiled rice grains in water to increase the moisture content thereof to about 20% whereby the grains become checked, steaming the soaked rice grains for about 30 seconds, and thereafter drying the rice to a stable moisture content, said process serving to alter the structure of the grains in order that upon subsequent cooking the rice will absorb water very rapidly so that the time required for cooking is reduced.

4. A process for preparing quick cooking rice which comprises soaking hulled ungelatinized rice grains in water at a temperature below gelatinization temperatures to increase the moisture content thereof to within the range of about 25–30% whereby the grains become checked, steaming the soaked rice grains for at least about 30 seconds under conditions such as to increase their moisture content by not more than about 6%, and thereafter drying the rice to a stable moisture content, said process serving to alter the structure of the grains in order that upon subsequent cooking the rice will absorb water very rapidly so that the time required for cooking is reduced.

5. A process for preparing quick cooking rice which comprises soaking hulled, ungelatinized rice grains in water at a temperature below gelatinization temperatures to increase the moisture content thereof to about 30% whereby the grains become checked, steaming the soaked rice grains for a period of about 30 seconds to 5 minutes under conditions such as to increase their moisture content by not more than about 6%, and thereafter drying the rice to a stable moisture content, said process serving to alter the structure of the grains in order that upon subsequent cooking the rice will absorb water very rapidly so that the time required for cooking is reduced.

6. A process for preparing quick cooking rice which comprises soaking hulled, ungelatinized rice grains in water at a temperature below gelatinization temperatures to increase the moisture content thereof to about 30% whereby the grains become checked, steaming the soaked rice grains for about 5 minutes under conditions such as to increase their moisture content by not more than about 6%, and thereafter drying the rice to a stable moisture content, said process serving to alter the structure of the grains in order that upon subsequent cooking the rice will absorb water very rapidly so that the time required for cooking is reduced.

7. A process for preparing quick cooking rice in the form of whole, at least partially gelatinized grains the structure of which has been altered so that the grains are capable of rapid rehydration to the condition of soft textured whole grain cooked rice which comprises soaking hulled, ungelatinized rice grains in water at a temperature below gelatinization temperatures to increase the moisture content of the grains to about 25–30%, then passing steam rapidly through the grains for a period of from 30 seconds to 5–15 minutes under conditions such that the moisture content of the grains is increased by not more than about 6%, and thereafter drying the grains to a stable moisture content.

8. Quick cooking rice in the form of whole, at least partially gelatinized grains in which the structure of the grains has been altered by the process defined in claim 1 so that the grains are capable of rapid rehydration in water and can be quickly cooked to the condition of soft textured whole grain cooked rice.

References Cited in the file of this patent

UNITED STATES PATENTS

| | | |
|---|---|---|
| 400,835 | Donelson | Apr. 2, 1889 |
| 1,364,912 | Baumgartner | Jan. 11, 1921 |
| 2,438,939 | Ozai-Durrani | Apr. 6, 1948 |

FOREIGN PATENTS

| | | |
|---|---|---|
| 579,981 | Great Britain | Aug. 22, 1946 |